(12) United States Patent
Simpson et al.

(10) Patent No.: US 9,933,287 B2
(45) Date of Patent: Apr. 3, 2018

(54) INDICATING DEVICE WITH LIGHT-PICKUP CONFIGURATION

(71) Applicants: DENSO International America, Inc., Southfield, MI (US); DENSO CORPORATION, Kariya, Aichi-pref. (JP)

(72) Inventors: Austin Simpson, Detroit, MI (US); Ryo Kunitachi, Novi, MI (US); Jagadeesh Krishnamurthy, Troy, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 150 days.

(21) Appl. No.: 15/052,061

(22) Filed: Feb. 24, 2016

(65) Prior Publication Data

US 2017/0241816 A1    Aug. 24, 2017

(51) Int. Cl.
| | |
|---|---|
| *G01D 13/02* | (2006.01) |
| *G01D 13/22* | (2006.01) |
| *G01D 11/28* | (2006.01) |
| *G01D 13/28* | (2006.01) |
| *G01D 13/26* | (2006.01) |

(52) U.S. Cl.
CPC ............ *G01D 13/28* (2013.01); *G01D 11/28* (2013.01); *G01D 13/02* (2013.01); *G01D 13/265* (2013.01)

(58) Field of Classification Search
CPC ........ G01D 11/28; G01D 13/00; G01D 13/02; G01D 13/22; G01D 13/265

USPC ........... 116/288, DIG. 6, DIG. 36; 362/23.21
See application file for complete search history.

(56) References Cited

U.S. PATENT DOCUMENTS

| | | | | |
|---|---|---|---|---|
| 6,626,549 | B2 * | 9/2003 | Fujita et al. ........... | G01D 11/28 362/23.16 |
| 7,665,857 | B2 * | 2/2010 | Harada et al. ......... | G01D 11/28 116/288 |
| 8,997,683 | B2 * | 4/2015 | Terao et al. ............ | B60K 35/00 116/286 |
| 2009/0038535 | A1 * | 2/2009 | Morales et al. ....... | G01D 11/28 116/288 |
| 2013/0314891 | A1 * | 11/2013 | Miyazawa et al. .. | G01D 13/265 362/23.14 |
| 2017/0241815 | A1 * | 8/2017 | Krishnamurthy ...... | G01D 13/28 |

FOREIGN PATENT DOCUMENTS

| | | | | | |
|---|---|---|---|---|---|
| JP | 2002243508 | A | * | 8/2002 | ............. G01D 11/28 |
| JP | 2005227050 | A | * | 8/2005 | ............. G01D 11/28 |
| JP | 2009092462 | A | * | 4/2009 | ............. G01D 11/28 |
| JP | 2013024698 | A | * | 2/2013 | ............. G01D 11/28 |

* cited by examiner

*Primary Examiner* — Richard A. Smith

(57) ABSTRACT

A pointer is rotational relative to the dial plate. The pointer includes a pointer shaft, which is non-opaque to conduct light therethrough. A driver unit includes a drive shaft coaxial with the pointer shaft. A light source emits light. A hub interconnects the pointer shaft with the drive shaft. The hub includes a light pickup, which is non-opaque to receive light from the light source and to conduct the light into the pointer shaft.

15 Claims, 9 Drawing Sheets

INDICATING DEVICE WITH LIGHT-PICKUP CONFIGURATION

TECHNICAL FIELD

The present disclosure relates to an indicating device.

BACKGROUND

Conventionally, an indicating device such as a dial gauge includes a pointer rotational to indicate information such as a speed or an engine revolution of a vehicle. An indicating device may have an illuminative configuration including a light source and a light pickup. The light pickup receives light emitted from the light source and directs the light for illumination.

SUMMARY

According to an aspect of the preset disclosure, a pointer may be rotational relative to a dial plate. The pointer may include a pointer shaft, which is non-opaque. A driver unit may include a drive shaft coaxial with the pointer shaft. A light source may emit light. A hub may interconnect the pointer shaft with the drive shaft. The hub may include a light pickup, which is non-opaque to receive light from the light source and to conduct the light into the pointer shaft.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, an indicating device 1 will be described with reference to drawings. In drawing(s), "VERTICAL" may correspond to a vertical direction. "AXIAL" may correspond to an axial direction. "RADIAL" may correspond to a radial direction. "CIRCUMFERENTIAL" may correspond to a circumferential direction.

Figure 1:
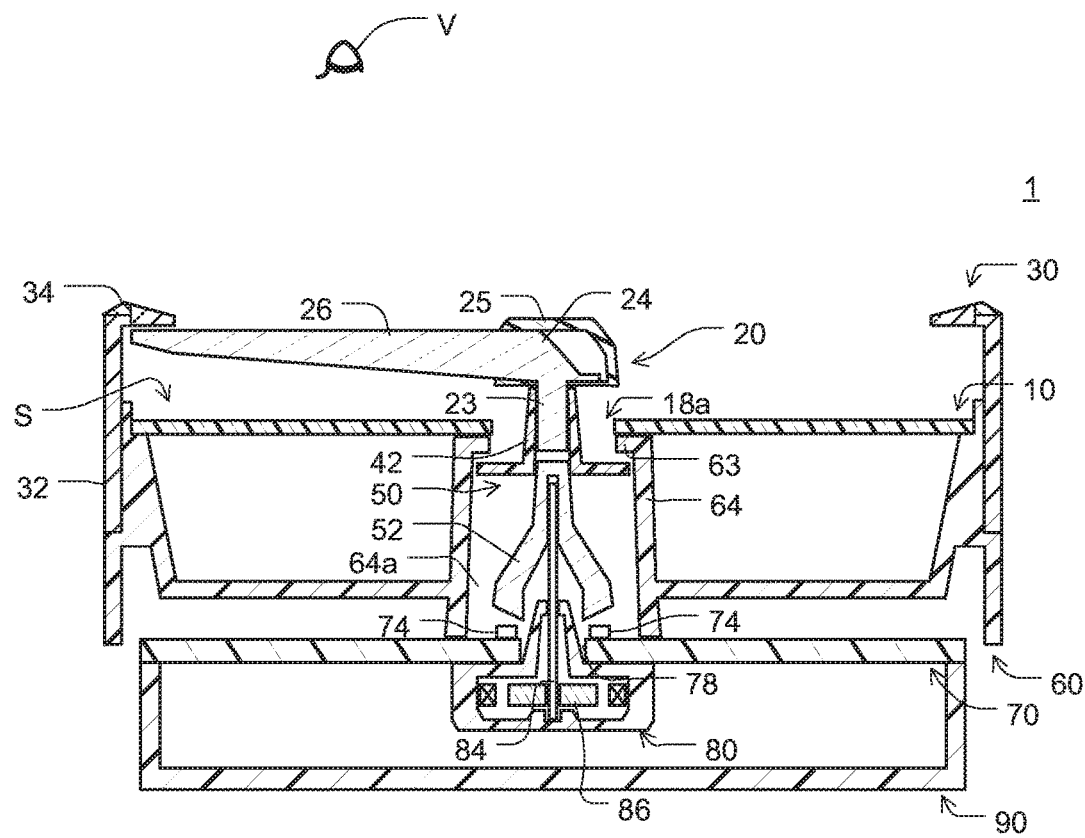
FIG. 1 is a sectional view showing an indicating device of a first embodiment.
Figure 1:
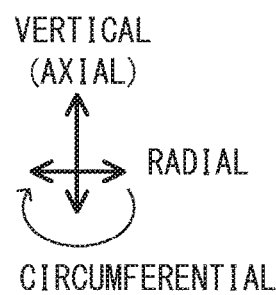

In FIG. 1, the indicating device 1 is, for example, an engine revolution meter for an automobile. The indicating device 1 includes a pointer 20, a hub 50, a dial plate 10, a dial cover 30, a main housing 60, a printed circuit board (PCB) 70, a driver unit 80, and a rear housing 90.

The dial plate 10 has a display surface facing a viewer V such as an occupant of an automobile. The dial plate 10 is in a circular shape when viewed from the viewer V. The dial plate 10 has indication marks such as a dial gauge and symbols S to form a gauge meter. The symbols S may be numbers to denote engine revolution. The dial plate 10 may be formed of resin such as polycarbonate. The dial plate 10 has a center hole 18a at its center.

The dial cover 30 is a tubular member placed above the dial plate 10. The pointer 20 is inserted in the center hole 18a of the dial plate 10. The pointer 20 is located adjacent to the display surface of the dial plate 10. The pointer 20 includes a pointer shaft 23, a body 24, a needle 26, and a cover 25.

In the example, the pointer shaft 23, the body 24, and the needle 26 are formed of a non-opaque light-conductive material such as a translucent resin (e.g., polycarbonate resin or PMMA resin). The needle 26 is substantially at a right angle relative to the pointer shaft 23. The body 24 and the needle 26 are located above the center hole 18a of the dial plate 10. The pointer shaft 23 extends through the center hole 18a. The cover 25 is formed of an opaque material such as ABS resin. The cover 25 is coupled with the body 24 to enclose the body 24.

The PCB 70 is located between the main housing 60 and the rear housing 90. The PCB 70 has a center hole 78 at its center. The PCB 70 is equipped with electronic wirings and electronic devices such as a microprocessor. The PCB 70 is further equipped with light emitting diodes (LED, light source) 74 around the center hole 78.

The driver unit 80 is equipped to the PCB 70. For example, the driver unit 80 may be soldered to the PCB 70. The driver unit 80 may be an electric motor such as a stepper motor. The driver unit 80 includes a drive shaft 84 and a motor portion 86. The drive shaft 84 is coupled with a rotor of the motor portion 86. The motor portion 86 includes a stator configured to receive electricity from a controller (not shown) via the wiring of the PCB 70 to generate a magnetic field and to drive the drive shaft 84 via the rotor. The driver unit 80 may be equipped with reduction gears combined with the motor portion 86. The drive shaft 84 is coupled with the pointer shaft 23 of the pointer 20 via the hub 50 to manipulate the pointer 20 at an appropriate position to point the tick marks and the symbols S on the dial plate 10.

The main housing 60 includes a housing center 64 defining a tubular hollow 64a. The housing center 64 has a brim 63 extending radially inward toward the hub 50. The hub 50 is located in the tubular hollow 64a. The rear housing 90 is equipped to the PCB 70 to accommodate the driver unit 80.

Figure 2:
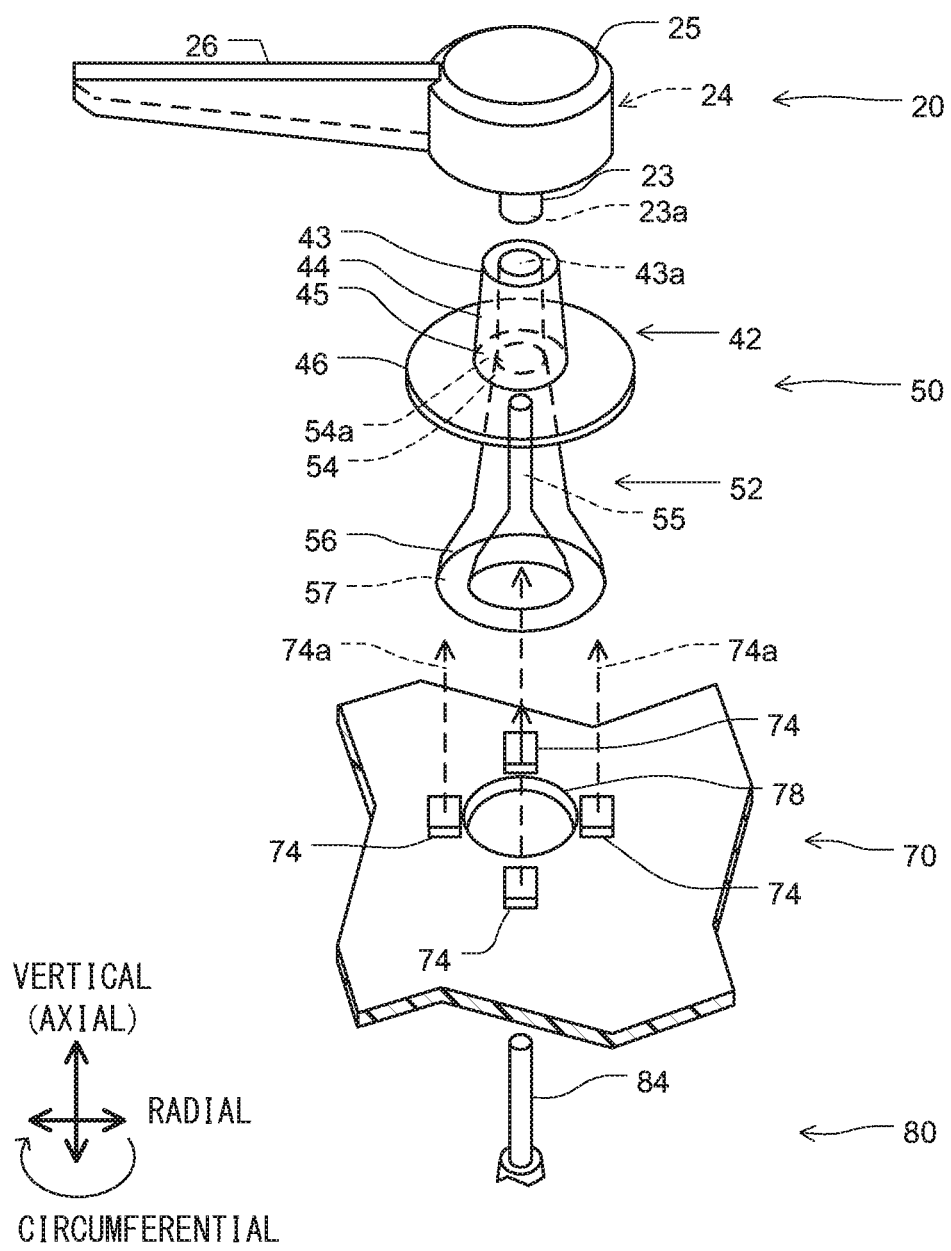
FIG. 2 is a perspective view showing components of the indicating device.

In FIG. 2, the pointer 20 is inserted into the hub 50. The drive shaft 84 is inserted into the hub 50 through the center hole 78 of the PCB 70. Thus, the hub 50 is coupled with the drive shaft 84 of the driver unit 80. The hub 50 interconnects the pointer shaft 23 with the drive shaft 84, such that the drive shaft 84 of the driver unit 80 is located to be coaxial with the pointer shaft 23. Thus, the hub 50 is rotational together with the pointer shaft 23 and the drive shaft 84. After the connection, the drive shaft 84 of the driver unit 80 extends through the center hole 78 of the PCB 70.

The LEDs 74 include multiple light source elements 74 located on the radially outside of the drive shaft 84 to surround the drive shaft 84. The LEDs 74 are positioned on the PCB 70, such that a light receiving surface 57 of the light pickup 52 is opposed to optical axes 74a of the LEDs 74.

According to the present example, the hub 50 includes a light pickup 52 and a cover 42. The light pickup 52 is formed of a non-opaque light-conductive material such as a translucent resin (e.g., polycarbonate resin or PMMA resin). The light pickup 52 is in a conical shape (funnel shape) having a closed tip end 54 and an open end 56. The light pickup 52 reduces in the outer diameter along an axial direction from the open end 56 toward the closed tip end 54. The axial direction is along elongated directions of the hub 50, the pointer shaft 23, and the drive shaft 84, which are coaxial with each other. The axial direction is along the vertical direction in the drawing. The open end 56 has the light receiving surface 57 opposed to the LEDs 74. The open end 56 is hollow to form a cavity therein. The open end 56 has a drive shaft hole 55 into which the drive shaft 84 is inserted. The closed tip end 54 is chamfered to form a flat surface 54a. The flat surface 54a is opposed to a light receiving surface 23a of the pointer shaft 23. The light pickup 52 is configured to receive light from the LEDs 74 and to conduct the light therethrough from the light receiving surface 57 toward the closed tip end 54 radially inward in the axial direction. In this way, the light pickup 52 conducts the light into the pointer shaft 23.

The cover 42 of the hub 50 is coupled with the light pickup 52. The cover 42 is formed of an opaque material such as polycarbonate resin or ABS resin. The cover 42 includes a tubular portion 44 and a collar portion 46. The tubular portion 44 has a tip tubular end 43 and a base tubular end 45. The tip tubular end 43 has a pointer shaft hole 43a into which the pointer shaft 23 is inserted, such that the tip tubular end 43 is connected with the pointer shaft 23. The base tubular end 45 is connected with the closed tip end 54 of the light pickup 52. The collar portion 46 is in a disc shape extending radially outward from the base tubular end 45. In the present embodiment, the cover 42 is molded of an opaque resin, and the light pickup 52 is molded of a non-opaque resin. The cover 42 and the light pickup 52 are integrally molded together by, for example, two-shot molding (insert molding). Specifically, the light pickup 52 may be molded in advance by using a molding dies, and subsequently, the molded light pickup 52 may be placed in a different molding dies for molding the cover 42. In this way, the cover 42 may be molded on the closed tip end 54 of the light pickup 52. The base tubular end 45 of the cover 42 molded in this way may be fused with the outer periphery of the closed tip end 54 of the light pickup 52.

Figure 3:
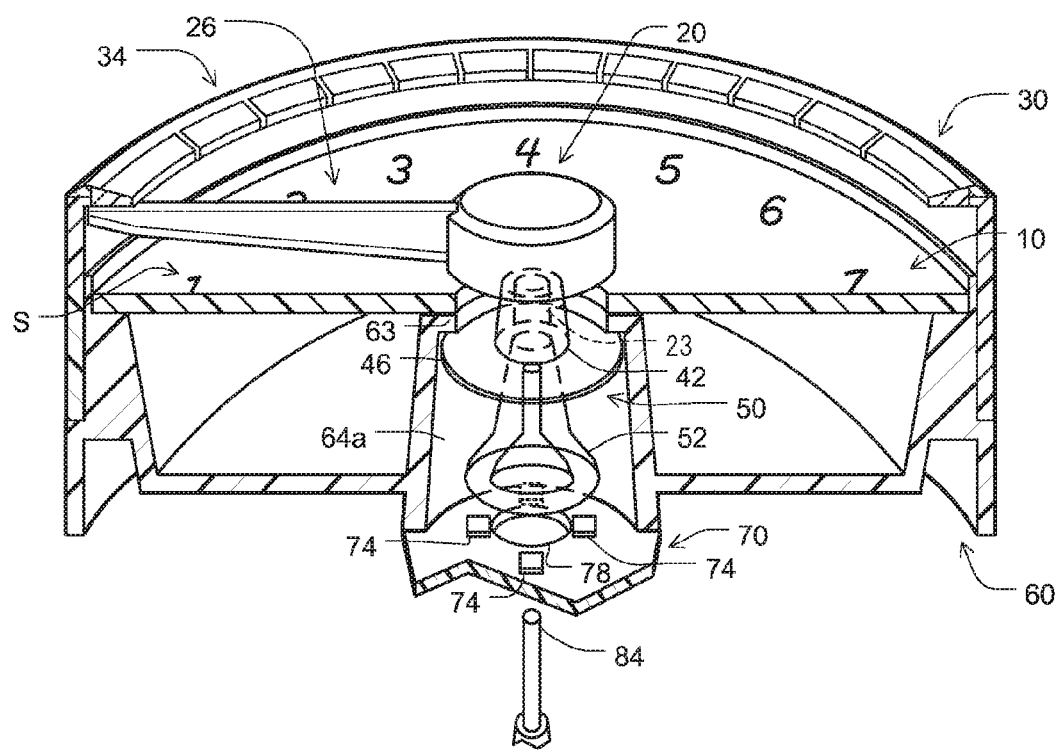
FIG. 3 is a perspective sectional view showing the indicating device.

FIG. 3 shows a part of the indicating device 1. The indicating device 1 may be assembled through the following steps. First, the driver unit 80 is soldered on the PCB 70. The hub 50 is attached to the drive shaft 84 of the driver unit 80. The main housing 60 is mounted onto the PCB 70, such that the hub 50 is accommodated in the tubular hollow 64a. The dial gauge 10 is mounted onto the main housing 60. The pointer 20 is mounted to the hub 50. Finally, the dial cover 30 is mounted onto the dial gauge 10 and the main housing 60. If dimension permits, the dial cover 30 may be mounted onto the dial gauge 10 and the main housing 60, and subsequently, the pointer 20 may be mounted to the hub 50.

In FIG. 3, the collar portion 46 has a surface in an annular shape. The surface of the collar portion 46 is directed downward in the drawing and is opposed to the LEDs 74. The collar portion 46 has a periphery in a ring shape. The periphery of the collar portion 46 is opposed to both the brim 63 and the dial plate 10 in the axial direction.

In this way, the collar portion 46 may partition the tubular hollow 64a into one space on the side of the dial plate 10 and the other space on the side of the PCB 70. The cover 42 is configured to shield light incident from the light pickup 52.

Figure 4:
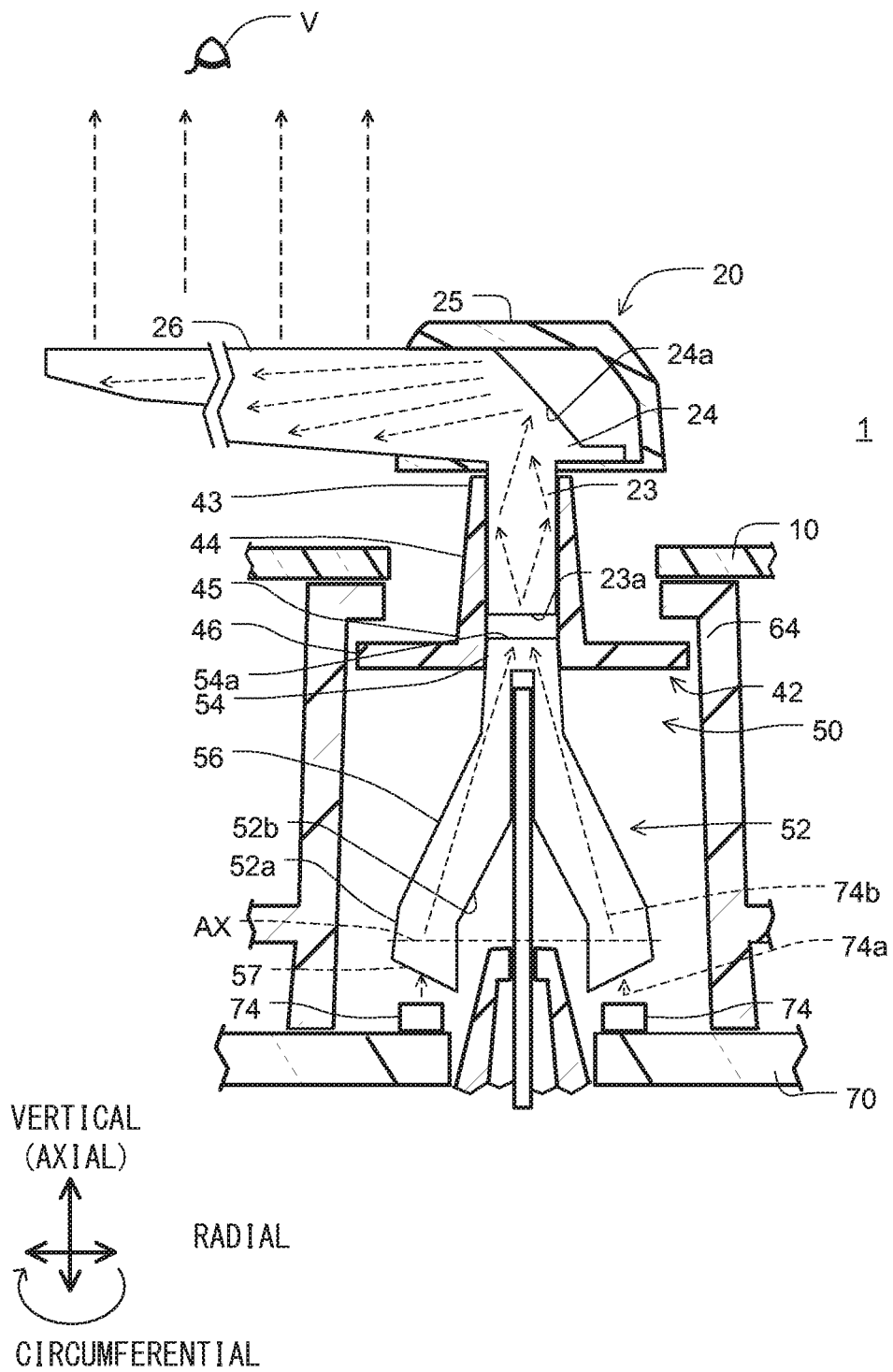
FIG. 4 is an explanatory view showing components of the indicating device.

As shown in FIG. 4, when each of the LEDs 74 is energized, the LED 74 emits light along an optical axis 74a. The light passes along an optical path 74b through the light pickup 52 toward the pointer shaft 23 of the pointer 20. The light after passing through the light pickup 52 is emitted through the flat surface 54a to pass through a hollow space within the tubular portion 44 of the cover 42 toward the light receiving surface 23a. The light further passes through the pointer shaft 23, and the light is reflected on an angled surface 24a of the body 24. The reflected light is directed toward the needle 26 and is further reflected toward the viewer V. In this way, the light illuminates the pointer 20, and the illuminated pointer 20 is rendered viewable for the viewer V.

In FIG. 4, the light receiving surface 57 is non-horizontal relative to both the PCB 70 and the array of the LEDs 74. Specifically, the light receiving surface 57 is at an angle relative to the radial direction, such that the center portion of the open end 56 is projected toward the LEDs 74. The light receiving surface 57 is in a ring-shaped tapered shape being convex at the center. In other words, the light receiving surface 57 is at an angle relative to the radial direction, which is perpendicular to the optical axis 74a of light incident from the LEDs 74. The light receiving surface 57 is angled relative to an axial section AX of the light pickup 52. The axial section AX is perpendicular to the axial direction. Thus, the light receiving surface 57 is configured to refract the light incident from the LEDs 74 toward the flat surface 54a of the closed tip end 54.

Figure 5:
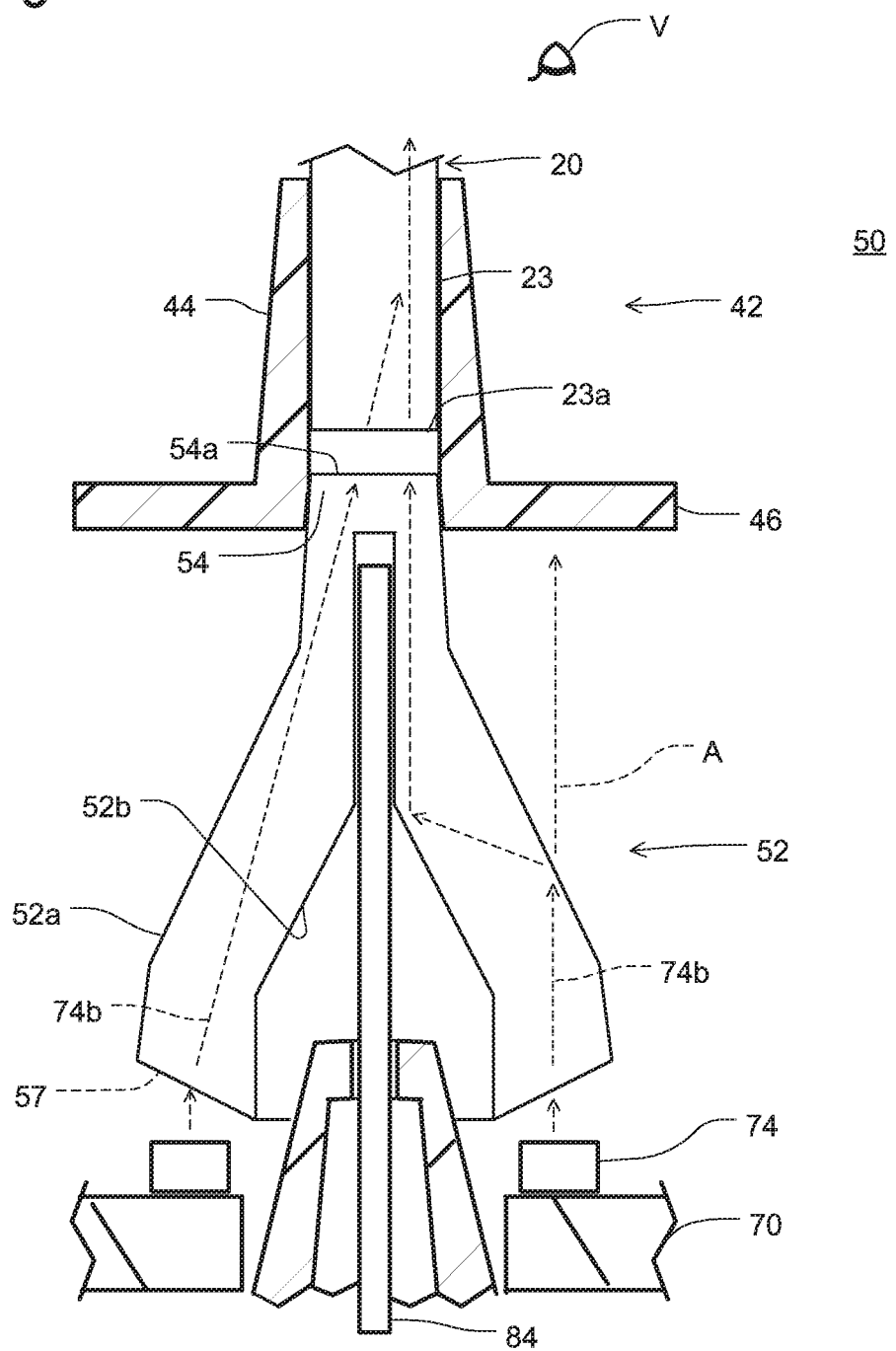
FIG. 5 is an explanatory view showing optical paths in the components.

The LEDs 74 emits light including multiple light flux. The light flux passes through the light pickup 52 and the pointer 20 through multiple optical paths 74b. In FIG. 5, on the left side, the optical pass 74b caused by one of the optical fluxes shows the light refracted on the light receiving surface 57 toward the pointer shaft 23. In FIG. 5, on the right side, the optical pass 74b caused by another one of the optical fluxes shows the light passing though the light receiving surface 57 toward an external surface 52a of the light pickup 52. The external surface 52a reflects the light incident from the light receiving surface 57 toward an internal surface 52b of the light pickup 52. The internal surface 52b further reflects the light from the external surface 52a toward the closed tip end 54. In this way, the light pickup 52 may direct light radially inward in the axial direction thereby to converge the light toward the pointer 20. In actual structure, the light may include innumerable light fluxes, which may repeatedly reflect on the internal and external surfaces 52b and 52a of the light pickup 52 or may pass linearly through the light pickup 52. The innumerable light fluxes may intersect with each other to advance toward the pointer 20.

As shown by an arrow A, the light incident from the light receiving surface 57 may pass through the light pickup 52 straight and may further pass though the external surface 52a linearly. The light along the arrow A is shielded by the collar portion 46 of the cover 42. Thus, the light leaking though the light pickup 52 is shielded by the collar portion 46 and is hardly visible by the viewer V.

Variation of First Embodiment

Figure 6:
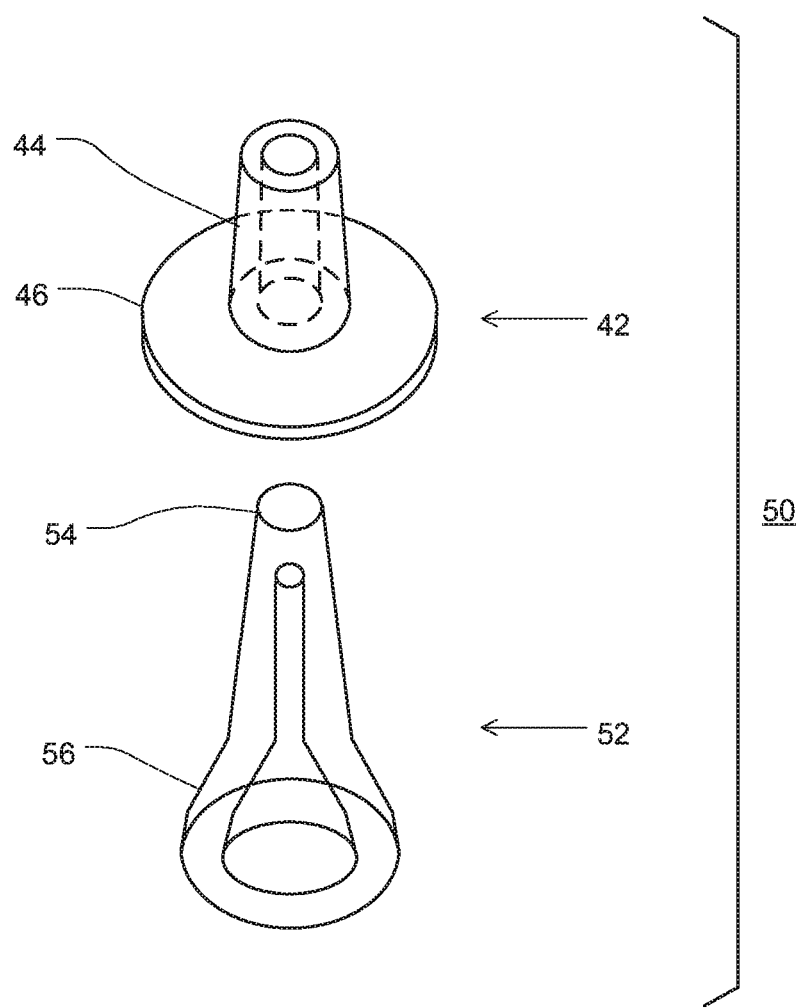
FIG. 6 is a perspective view showing a variation of the components.

As shown in FIG. 6, the cover 42 and the light pickup 52 may be separate components and may be coupled together by, for example, press-fitting tightly with each other. Similarly to the above-described example, the cover 42 may be molded of an opaque material such as an opaque resin, and the light pickup 52 may be molded of a non-opaque resin such as translucent resin.

Second Embodiment

Figure 7:
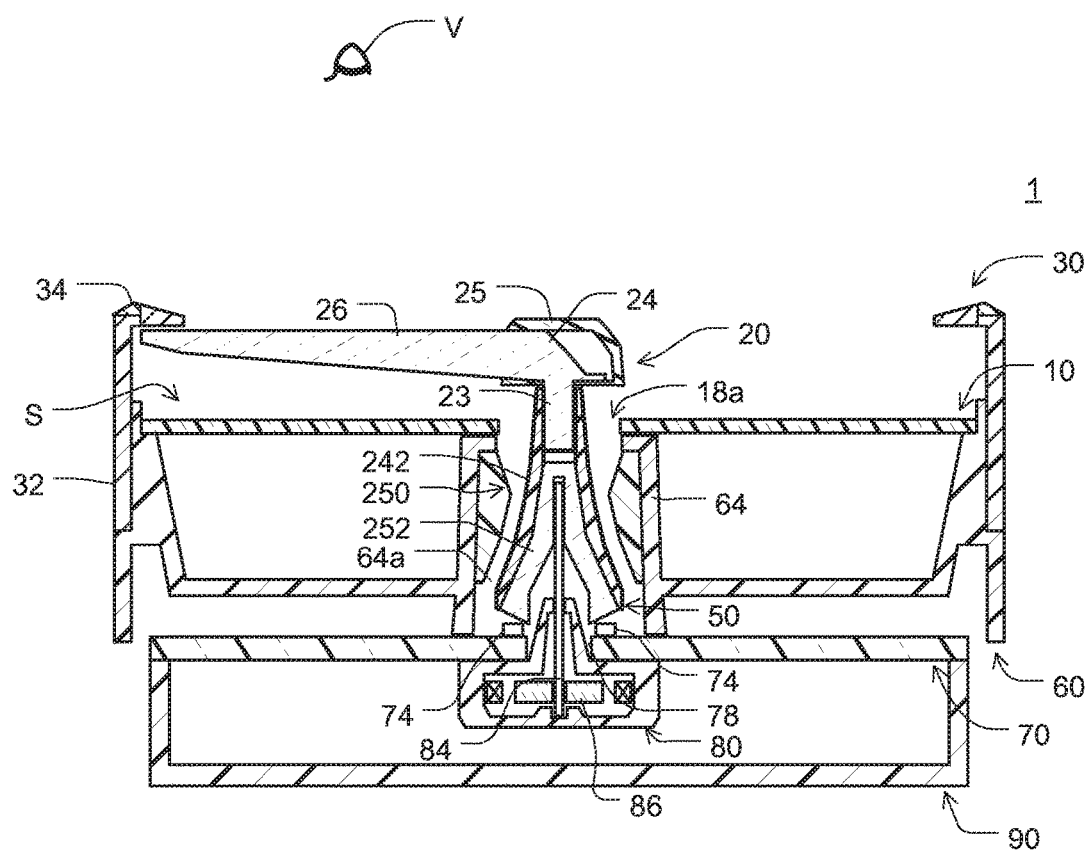
FIG. 7 is a sectional view showing an indicating device of a second embodiment.
Figure 7:
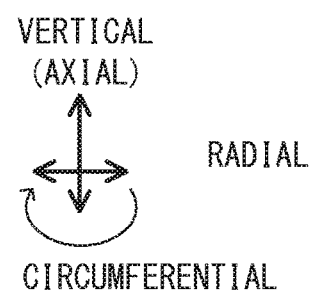
Figure 8:
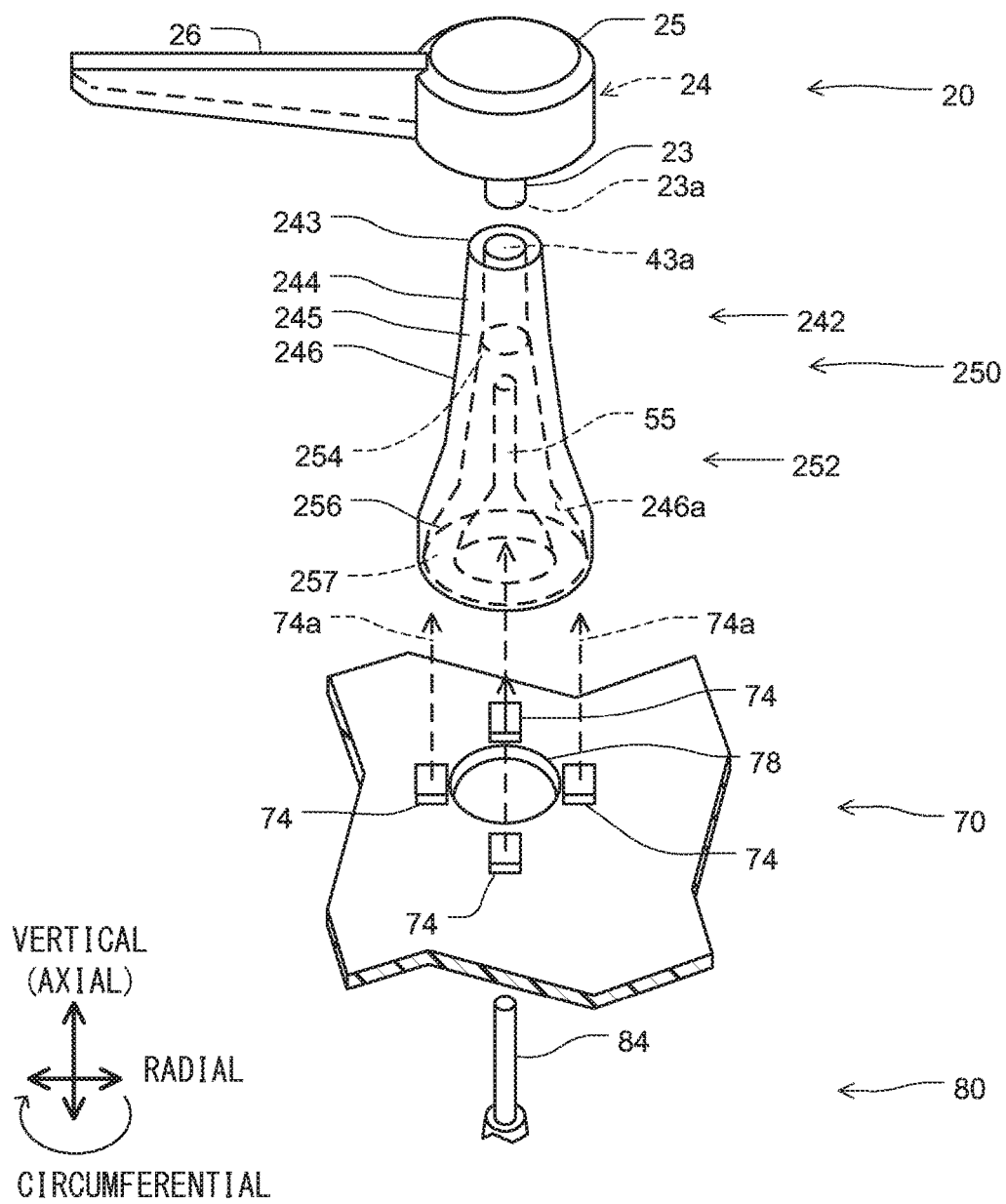
FIG. 8 is a perspective view showing components of the second embodiment.

As shown in FIGS. 7 and 8, a hub 250 may be in a different form from the hub 50 of the first embodiment. In this example, similarly to the first embodiment, the hub 250 is interposed between the LEDs 74 and the pointer 20 in the axial direction. The hub 250 includes a cover 242 and a light pickup 252.

In FIG. 8, the light pickup 252 is in a conical shape having a closed tip end 254 and an open end 256. The light pickup 252 reduces in the outer diameter along the axial direction from the open end 256 toward the closed tip end 254. The open end 256 has a light receiving surface 257 opposed to the LEDs 74. The cover 242 includes a tubular portion 244 and a body portion 246. The tubular portion 244 has a tip tubular end 243 and a base tubular end 245. The tip tubular end 243 is coupled with the pointer shaft 23. The base tubular end 245 is connected with the light pickup 252. Specifically, the body portion 246 is in a conical shape extending along an external surface 252a of the light pickup 252 to cover the exterior of the light pickup 252. That is, the body portion 246 is laminated on the light pickup 252. Thus, the light pickup 252 has a layered structure including the light pickup 252 and the body portion 246. The body portion 246 has an inner surface 246a in a conical shape, and the inner surface 246a is opposed to the LEDs 74.

Figure 9:
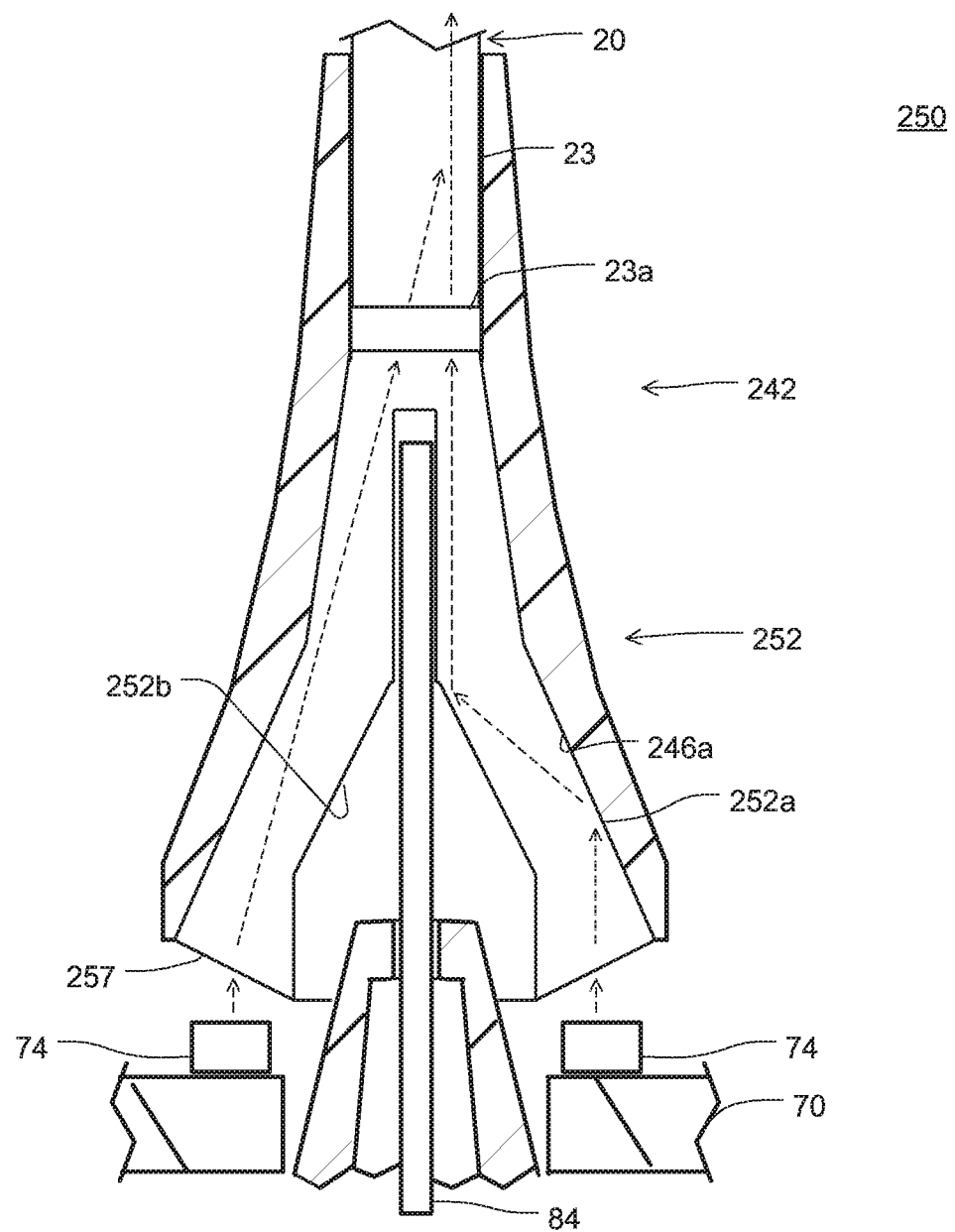
FIG. 9 is an explanatory view showing optical paths of the second embodiment.

As shown in FIG. 9, light emitted from the LEDs 74 enters through the light receiving surface 257 into the light pickup 252. The light may pass linearly through the light pickup 252 toward the pointer 20 and may pass through the light pickup 252 toward the pointer 20 after repeating reflection on both the external surface 252a and an internal surface 252b, similarly to the first embodiment. The light incident from the light receiving surface 257 may pass through the light pickup 252 straight and may further pass through the external surface 252a linearly. In the present example, the light passing through the external surface 252a is shielded by the inner surface 246a of the cover 242. Thus, the light is hardly visible by the viewer V also in the present embodiment.

Similarly to the first embodiment, the cover 242 and the light pickup 252 may be integrally molded together, or the cover 242 and the light pickup 252 may be separate components and may be fitted together.

Other Embodiments

The indicating device 1 may be used in various control panels or instrument panels, such as a speedo meter, a fuel meter, a mileage meter, other than the engine revolution meter. The cover of the hub may be omitted.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An indicating device comprising:
   a dial plate;
   a pointer rotational relative to the dial plate, the pointer including a pointer shaft, which is non-opaque;
   a driver unit including a drive shaft coaxial with the pointer shaft;
   a light source configured to emit light; and
   a hub interconnecting the pointer shaft with the drive shaft, wherein
   the hub includes a light pickup, which is non-opaque to receive light from the light source and to conduct the light into the pointer shaft, the light pickup is in a conical shape having a closed tip end and an open end,
   the light pickup reduces in an outer diameter along an axial direction from the open end toward the closed tip end, and
   the open end has a light receiving surface opposed to the light source, the hub includes a cover coupled with the light pickup, and
   the cover is opaque, the cover includes a tubular portion and a collar portion,
   the tubular portion has a tip tubular end and a base tubular end,
   the tip tubular end is connected with the pointer shaft,
   the base tubular end is connected with the light pickup, and
   the collar portion is in a disc shape extending radially outward from the base tubular end.

2. The indicating device according to claim 1, wherein the light source includes a plurality of light source elements located on a radially outside of the drive shaft to surround the drive shaft.

3. The indicating device according to claim 2, wherein the open end is hollow and has a drive shaft hole into which the drive shaft is inserted.

4. The indicating device according to claim 1, wherein the closed tip end is chamfered to form a flat surface, and the flat surface is opposed to a light receiving surface of the pointer shaft.

5. The indicating device according to claim 1, wherein the light pickup is configured to conduct light therethrough from the light receiving surface toward the closed tip end radially inward along the axial direction.

6. The indicating device according to claim 5, wherein the light receiving surface is in a ring-shaped tapered shape, and
   the light receiving surface is convex at a center projected toward the light source.

7. The indicating device according to claim 5, wherein the light pickup has an external surface and an internal surface,
   the external surface is configured to reflect light incident from the light receiving surface toward the internal surface, and
   the external surface is configured to reflect the light incident from the external surface toward the closed tip end.

8. The indicating device according to claim 1, wherein the cover is molded of an opaque resin,
   the light pickup is molded of a non-opaque resin, and
   the cover and the light pickup are integrally molded together.

9. The indicating device according to claim 1, wherein
the cover is molded of an opaque resin,
the light pickup is molded of a non-opaque resin, and
the cover and the light pickup are separate components and are coupled together.

10. The indicating device according to claim 1, wherein
the cover includes a tubular portion and a body portion,
the tubular portion has a tip tubular end and a base tubular end,
the tip tubular end is connected with the pointer shaft,
the base tubular end is connected with the light pickup, and
the body portion is in a conical shape extending along an external surface of the light pickup.

11. The indicating device according to claim 10, wherein
the hub is interposed between the light source and the pointer in the axial direction.

12. The indicating device according to claim 10, wherein
the cover is molded of an opaque resin,
the light pickup is molded of a non-opaque resin, and
the cover and the light pickup are integrally molded together.

13. The indicating device according to claim 10, wherein
the cover is molded of an opaque resin,
the light pickup is molded of a non-opaque resin, and
the cover and the light pickup are separate components and are coupled together.

14. A dial gauge comprising:
a dial plate;
a pointer rotational relative to the dial plate, the pointer including a pointer shaft, which is non-opaque;
a driver unit including a drive shaft coaxial with the pointer shaft;
a light source configured to emit light; and
a hub interconnecting the pointer shaft with the drive shaft, wherein
the hub includes a light pickup, which is non-opaque to receive light from the light source and to conduct the light into the pointer shaft, the light pickup is in a conical shape having a closed tip end and an open end,
the light pickup reduces in an outer diameter along an axial direction from the open end toward the closed tip end, and
the open end has a light receiving surface opposed to the light source, the hub includes a cover coupled with the light pickup, and
the cover is opaque, the cover includes a tubular portion and a collar portion,
the tubular portion has a tip tubular end and a base tubular end,
the tip tubular end is connected with the pointer shaft,
the base tubular end is connected with the light pickup, and
the collar portion is in a disc shape extending radially outward from the base tubular end,
the collar portion has a surface in an annular shape, and
the surface is opposed to the light source.

15. A dial gauge indicator comprising:
a dial plate;
a pointer rotational relative to the dial plate, the pointer including a pointer shaft, which is non-opaque;
a driver unit including a drive shaft coaxial with the pointer shaft;
a light source configured to emit light; and
a hub interconnecting the pointer shaft with the drive shaft, wherein
the hub includes a light pickup, which is non-opaque to receive light from the light source and to conduct the light into the pointer shaft, the light pickup is in a conical shape having a closed tip end and an open end,
the light pickup reduces in an outer diameter along an axial direction from the open end toward the closed tip end, and
the open end has a light receiving surface opposed to the light source, the hub includes a cover coupled with the light pickup, and
the cover is opaque, the cover includes a tubular portion and a collar portion,
the tubular portion has a tip tubular end and a base tubular end,
the tip tubular end is connected with the pointer shaft,
the base tubular end is connected with the light pickup, and
the collar portion is in a disc shape extending radially outward from the base tubular end, the collar portion has a periphery in a ring shape, and
the periphery is opposed to the dial plate in the axial direction.

* * * * *